(12) United States Patent
Schultz et al.

(10) Patent No.: US 7,669,527 B2
(45) Date of Patent: Mar. 2, 2010

(54) MOVING BELT DOUGH PRESS WITH HEATED PLATEN

(75) Inventors: Jim Schultz, Palos Heights, IL (US); Mark Van Drunen, Lansing, IL (US)

(73) Assignee: AM Manufacturing Co., Dolton, IL (US)

( * ) Notice: Subject to any disclaimer, the term of this patent is extended or adjusted under 35 U.S.C. 154(b) by 76 days.

(21) Appl. No.: 11/639,900

(22) Filed: Dec. 15, 2006

(65) Prior Publication Data

US 2008/0141874 A1 Jun. 19, 2008

(51) Int. Cl.
*B30B 15/34* (2006.01)

(52) U.S. Cl. ........................ 100/326; 100/178; 100/295; 100/320; 99/349; 99/373

(58) Field of Classification Search .................. 100/151, 100/152, 153, 154, 177, 178, 215, 216, 226, 100/306, 325, 326, 320, 321; 99/349, 373, 99/352, 353, 404, 423, 426, 427, 443 C; 425/167, 425/371; 426/496, 497, 505, 512, 523
See application file for complete search history.

(56) References Cited

U.S. PATENT DOCUMENTS

| 2,313,968 | A | * | 3/1943 | Reich | ........................... 99/375 |
|---|---|---|---|---|---|
| 2,668,897 | A | * | 2/1954 | Beach et al. | ................. 219/251 |
| 4,559,002 | A | | 12/1985 | Atwood | |
| 4,938,126 | A | * | 7/1990 | Rubio et al. | .................. 99/349 |
| 5,231,919 | A | | 8/1993 | Lawrence | |
| 5,396,833 | A | | 3/1995 | Atwood et al. | |
| 5,417,149 | A | * | 5/1995 | Raio et al. | ..................... 99/349 |
| 5,570,625 | A | * | 11/1996 | Liebermann | .................. 99/330 |
| 6,951,451 | B2 | | 10/2005 | Schultz | |
| 2004/0241267 | A1 | * | 12/2004 | Schultz | ........................ 425/193 |
| 2005/0287240 | A1 | * | 12/2005 | Mattias et al. | .............. 425/408 |
| 2007/0034092 | A1 | * | 2/2007 | Lawrence et al. | ............. 99/349 |

* cited by examiner

*Primary Examiner*—Jimmy T Nguyen
(74) *Attorney, Agent, or Firm*—Greer, Burns & Crain Ltd

(57) ABSTRACT

A moving belt conveyor dough press is provided with a pair of vertically opposing platens, at least one of which is movable toward and away from the other. A continuous belt is arranged to pass between the pair of platens, and to carry on an upper surface thereof, a supply of dough masses to be pressed by the platens. At least one of the platens is formed of a cast metal material, and an electrical resistance heating element is cast in place within the at least one platen.

14 Claims, 6 Drawing Sheets

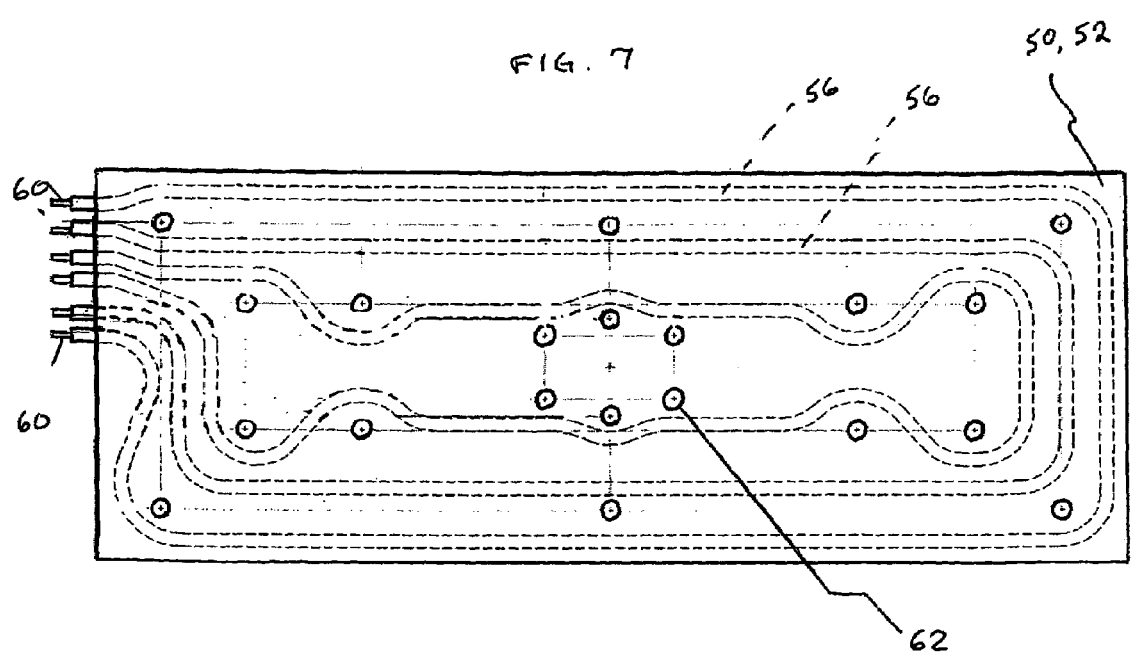

MOVING BELT DOUGH PRESS WITH HEATED PLATEN

BACKGROUND OF THE INVENTION

The present invention relates to presses used to flatten dough-like material, for example edible dough materials used in tortillas, pizzas and similar food items.

Presses for dough material are well known and one type comprises a stationary press, such as disclosed in U.S. Pat. No. 4,559,002, in which individual dough pieces are placed under a vertically movable platen, the platen compresses and spreads out the dough and then the platen is moved away revealing a flattened dough piece which must be manually removed. Typically such stationary presses utilize a relatively small platen since only one, or a small number of dough pieces are being pressed at a single time.

Another type is an automated dough press which typically comprises an intermittently moving belt and a vertically reciprocating platen, such as disclosed in U.S. Pat. Nos. 5,231,919 and 5,396,833. In an indexing belt press, the belt is stopped, and while stopped the platen moves downwardly to engage and flatten a dough piece against the belt and then the platen moves upwardly. Subsequently the belt indexes to the next position to present a new series of dough pieces to the platen. Generally a large number of dough pieces, such as 12 to 20 individual dough pieces are pressed simultaneously by the platens, which are relatively large in comparison to the size used in stationary presses. Another type of automated dough press utilizes a continuously moving belt for receiving and carrying the large number of dough pieces into the press area for simultaneous flattening, and from the press area to a point of further utilization, such as disclosed in U.S. Pat. No. 6,951,451. Vertically reciprocating platens are used to press the dough pieces into flattened shapes and one or both of the platens can be heated so as to provide heat into the dough product.

The heating of the platens has been provided by electrical resistance heating elements. In stationary presses, utilizing a relatively small platen, the heating elements have been cast in place in the platen as it is formed. However, in moving belt presses, either indexing or continuously moving belt presses, the platens are substantially larger and the heating elements are provided separately, in rod shapes, and are inserted into bore holes formed in the platens after they are formed. The bore holes must be drilled with precision. That is, the bore holes must be very straight and have very tight tolerances, in order to allow the rod shaped heating elements to be inserted and later removed, as well as to be positioned very close to the wall of the bore holes. If there is too much clearance between the heating element and the wall of the bore hole, conduction of the heat from the heating element is reduced causing the heating element to overheat and prematurely fail. When a heating element fails, it must be removed, which, due to the very close tolerances, sometimes is very difficult or impossible to do, thereby requiring a new bore hole to be drilled into the platen, at a now less than optimal location for a new heating element. In the past, the concept of using cast in place heating elements in a moving belt press has not been considered at least for the reason that due to the relatively large size of the platens used in the moving belt presses, and thus the very high cost of replacing a platen should a heating element fail.

SUMMARY OF THE INVENTION

Applicant has discovered the surprising result that heating elements that are cast in place in the relatively large platens utilized in moving belt presses, do not fail due to overheating the way that separately inserted heating rods do, and therefore platens for moving belt presses can be provided with cast in place heating elements, in an economic manner, and without concern of having to replace the entire platen. The cost and time for assembly of the platens, with heating functionality, is greatly reduced, and reliability of press is greatly improved. Down time for the press, required for replacement of faulty heating elements is greatly reduced.

The present invention provides an apparatus for flattening dough pieces which combines the advantages of pressing the dough to obtain circular or other desired shapes, allows for heating the dough while pressing, allows for continuous operation with a moving belt carrying the dough pieces, and avoids the problems associated with various approaches known in the art.

In one embodiment of the invention, a moving belt conveyor dough press is provided with a pair of vertically opposing platens, at least one of which is movable toward and away from the other. A continuous belt is arranged to pass between the pair of platens, and to carry on an upper surface thereof, a supply of dough masses to be pressed by the platens. At least one of the platens is formed of a cast metal material, and an electrical resistance heating element is cast in place within the at least one platen.

In an embodiment of the invention, an upper one of the platens is vertically reciprocable and a lower one of the platens is vertically stationary.

In an embodiment of the invention, a pair of electrical terminals for the heating element are exposed at an exterior of the at least one platen.

In an embodiment of the invention, the electrical resistance heating element is cast in place in an upper one of the two platens.

In an embodiment of the invention, a plurality of electrical resistance heating elements are cast in place in the upper platen.

In an embodiment of the invention, both platens are formed of a cast metal material and an electrical resistance heating element is cast in place in both of the two platens.

In an embodiment of the invention, the platens are horizontally fixed in place.

In an embodiment of the invention, the platens are horizontally movable.

BRIEF DESCRIPTION OF THE DRAWINGS

FIG. 7 is a schematic plan view of a press platen illustrating an alternate heating element layout.

DETAILED DESCRIPTION OF THE PREFERRED EMBODIMENTS

Figure 1:
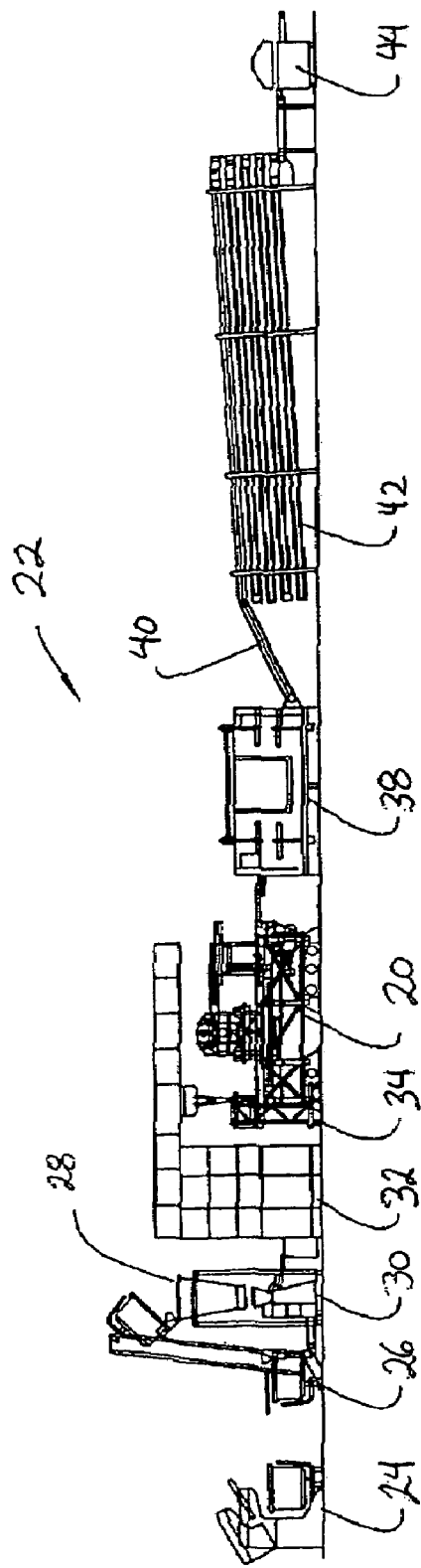
FIG. 1 is a schematic side elevation view of a dough processing system incorporating a press embodying the principles of the present invention.

The present invention relates to a press 20 for flattening dough pieces, for example, flattening dough balls into pancake like shapes for tortillas, pizza crusts and similar food products. Because of the high rates of product through the press, the press is typically arranged in a system 22 of mechanisms as illustrated schematically in FIGS. 1 and 3. This system can begin with a dough mixer 24 in which flour or similar product is mixed with water and other ingredients according to some particular recipe to produce a large batch of dough The mixer may include an elevator 26 to raise a portion of the mixer to an elevated position where the mixed dough batch is dropped into a holding hopper and dough chunker 28. In the holding hopper and dough chunker 28 the batch of dough is held and then chunks of dough are dispensed into a dough divider and rounder 30 in which the dough is divided into much smaller portions and is rounded into ball shapes. The rounder 30 then feeds individual dough balls 31 to a proofer 32 where the dough balls are held at a predetermined temperature and humidity for a prescribed length of time, such as by moving along a conveyor traveling through the proofer where the dough balls are held in individual pockets or trays in the proofer.

At the end of the proofing time, a series of dough balls 31 are dispensed through a dough loading apparatus 34 to a continuous belt 36 of the press 20, such as the press incorporating the principles of the present invention. In the press 20, the individual dough balls 31 are pressed between vertically opposed platens while the dough balls are carried on the movable endless conveyor belt 36, all as described in more detail below. When the dough balls 31 have been flattened into pancake-like shapes, they are dispensed from the end of the press 20 to an oven 38 where the dough products are partially or fully baked. Following the baling process, the dough pieces move on a conveyor 40 to a cooling conveyor 42 from where they are moved to a packing system 44 or storage area.

Figure 3:
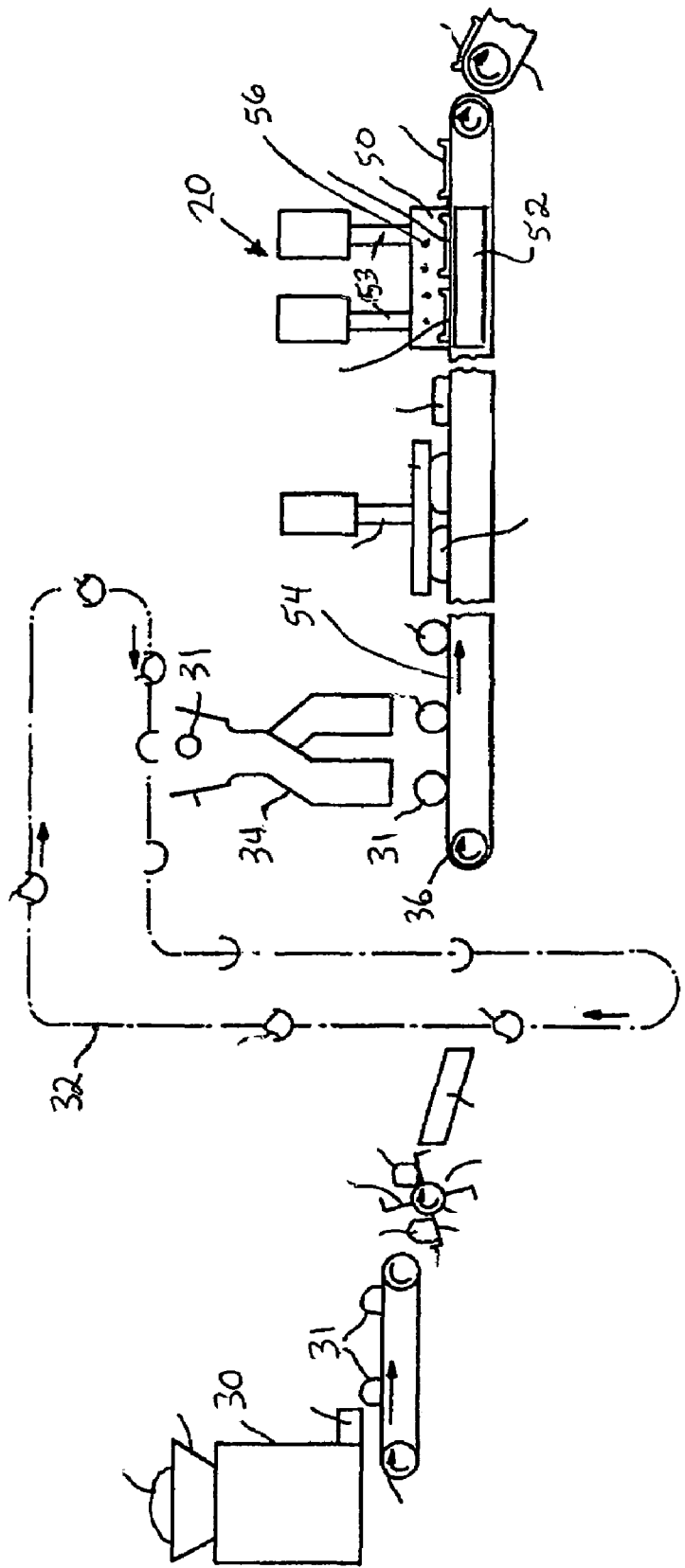
FIG. 3 is a schematic side elevation view of a dough processing system incorporating an indexing belt press embodying the principles of the present invention.

The dough balls 31 or other shaped dough masses carried on the belt 36 are to be pressed into flat pancake like shapes when the press 20 is being operated to form tortillas, pizza crusts and similarly shaped food items. To accomplish this, as shown in FIG. 3 the press 20 includes an upper platen 50 and a lower platen 52 which can reciprocate toward and away from each other to vary an open space therebetween through which the belt 36 passes. For example, either the upper platen 50 or the lower platen 52 may be vertically movable, or they may both be vertically movable, such as via one or more pistons 53. The two platens 50, 52 can move toward each other a sufficient amount to engage the dough balls 31 carried on an upper surface 54 of the belt 36 and to flatten them to a desired thickness and then to move away from one another to allow a new set of dough balls to be placed therebetween.

Figure 2:
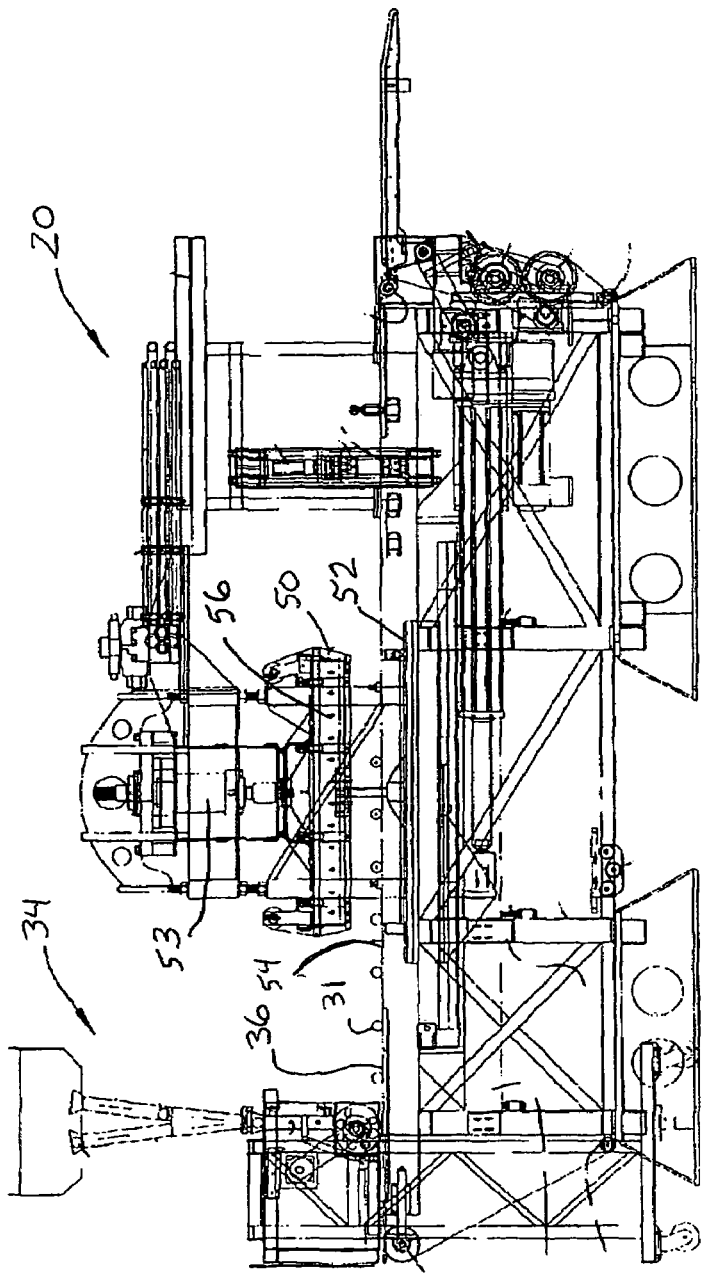
FIG. 2 is a side elevational view of a continuously moving belt press embodying the present invention.

In some presses 20, such as the one shown in FIG. 3, the upper 50 and lower 52 platens may be fixed in a horizontal position, such that one or both of them are free to reciprocate only vertically, such as described in U.S. Pat. No. 5,396,833, incorporated herein by reference. Such a press 20 is referred to as an indexing press in that the endless belt 36 is indexed forward a specific distance and then stopped while the press platens 50, 52 flatten the dough pieces 31. In other presses 20, such as the one shown in FIG. 2, the upper 50 and lower 52 platens can reciprocably move longitudinally relative to the press, that is, in the direction of the moving belt 36, such that while the platens are engaging and pressing the dough balls 31, the platens move in the same direction and at the same speed as the moving belt thereby allowing the belt to continue in its movement without slowing or stopping. Such an arrangement is shown and described in U.S. Pat. No. 6,951,451, incorporated herein by reference.

Figure 4:
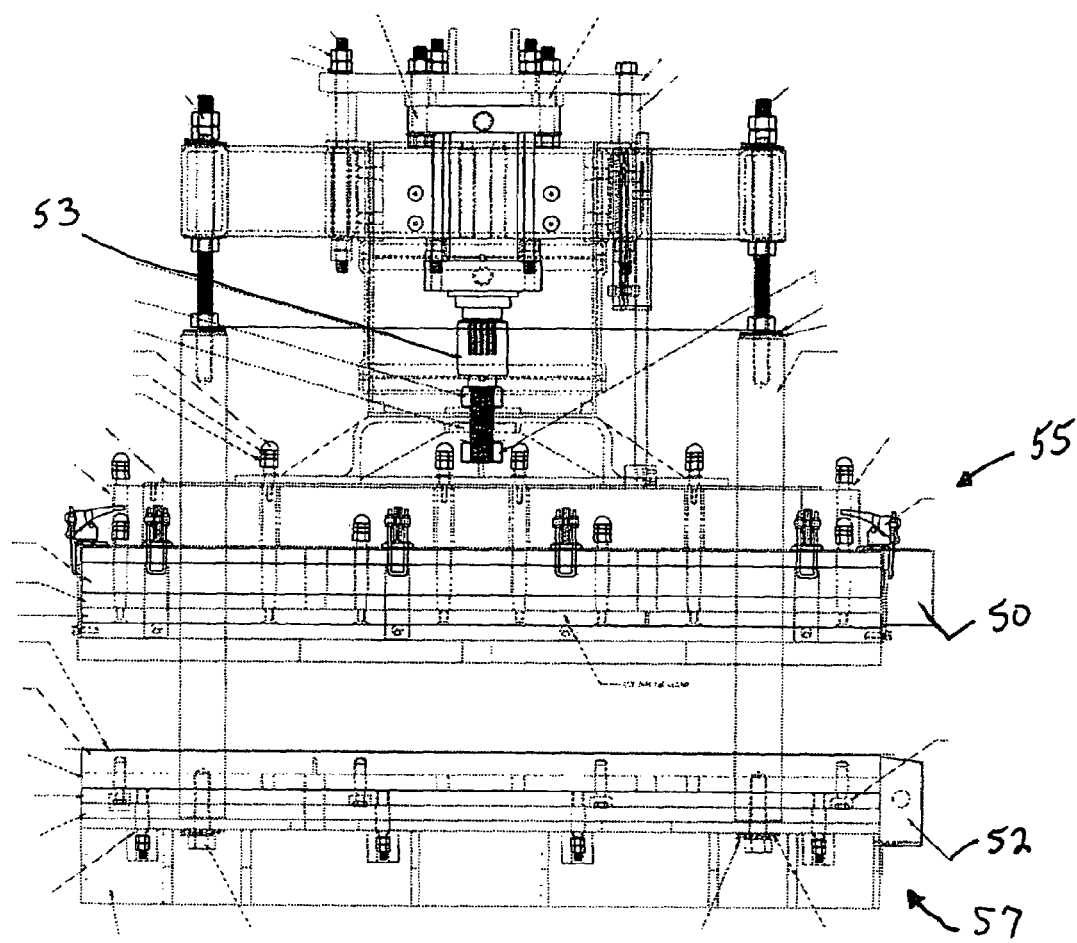
FIG. 4 is a side elevation view of the press platen assemblies shown in isolation.

The platens 50, 52 are shown in greater detail in FIG. 4 where it is seen that each of the platens incorporated into an upper 55 and a lower 57 platen assembly. The platens 50, 52 that are used in a moving belt press are generally quite massive, and generally have a length of between 32 and 60 inches, a width of between 32 and 60 inches and a thickness of at least an inch, all comprising substantially solid metal. The weight of each platen typically is at least 350 pounds and up to 1800 pounds for larger sized platens. At least one of the actual platens 50, 52 is formed of a cast metal material, and an electrical resistance heating element 56 (see FIGS. 5 and 6) is cast in place within the at least one platen as it is formed. In an embodiment of the invention, a pair of electrical terminals 60 for the heating element are exposed at an exterior of the at least one platen 50, 52 for connection of an electrical power cable. In other arrangements, the electrical terminals 60 may be located interior of the at least one platen 50, 52, with an electrical power cable connecting to the terminals at their interior location. In order to provide sufficient heat to the platens 50, 52 to maintain their elevated temperature of between about 150 to 550° F., total power for each heating element 56 could be at least 17,000 watts, with multiple heating elements used in each platen. Preferably with platens of the sizes mentioned, the heating elements 56 consume power of about 2.3 to 3.0 watts per square inch of platen area. For example, in a 48 inch by 48 inch platen, three heating elements 56 are provided, consuming a total of about 5000 to 6600 watts.

Figure 5:
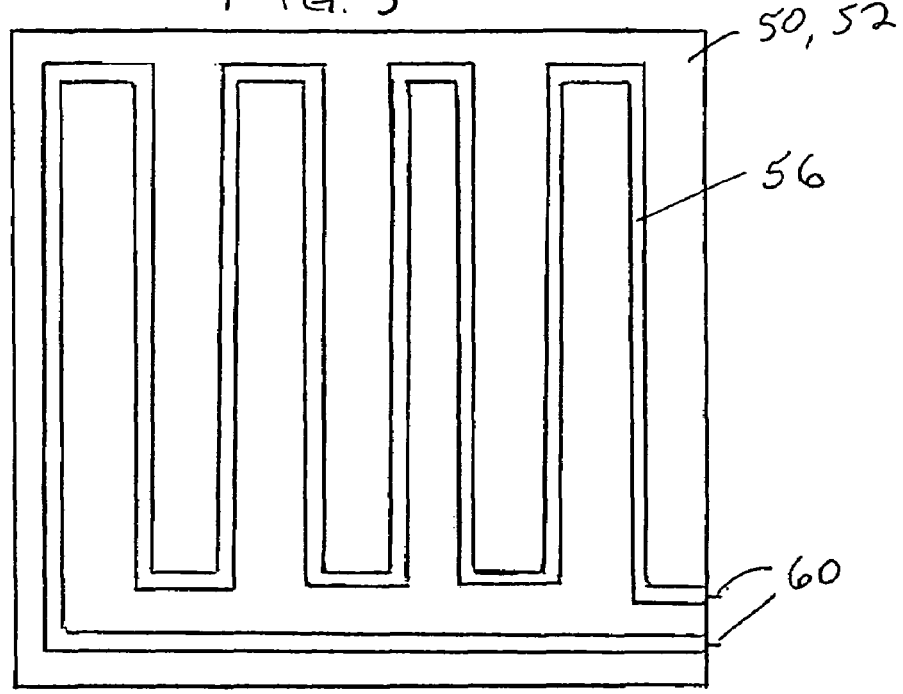
FIG. 5 is a schematic plan view of a press platen illustrating a heating element layout.
Figure 6:
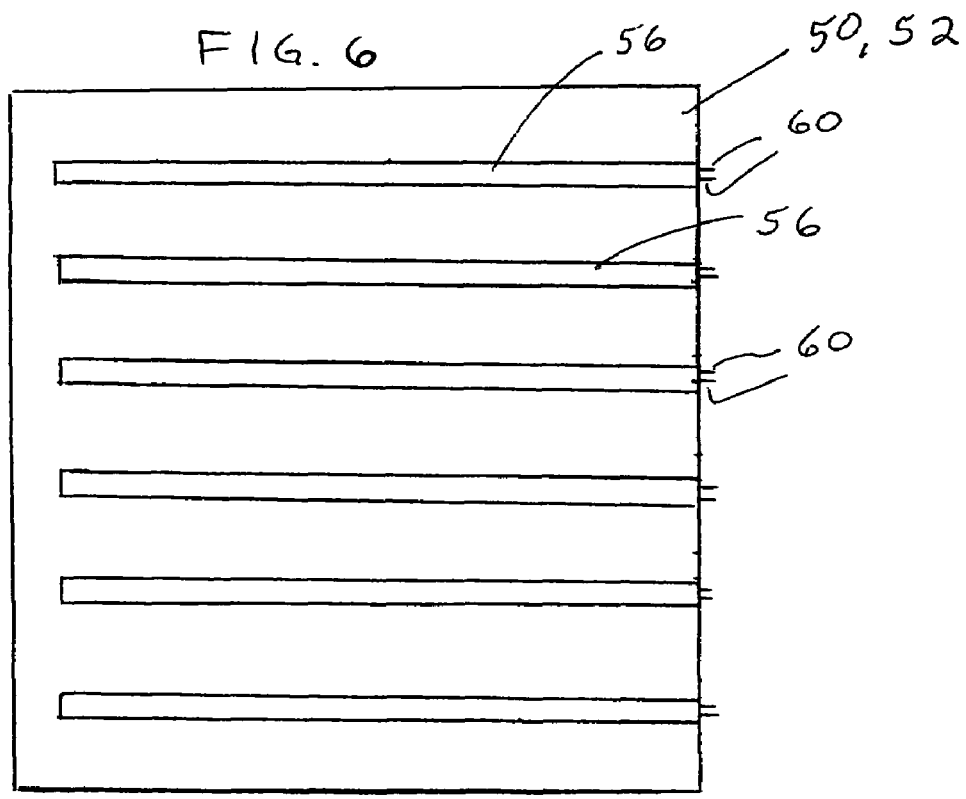
FIG. 6 is a schematic plan view of a press platen illustrating an alternate heating element layout.

In an embodiment of the invention, a single electrical resistance heating element 56 is cast into the at least one platen 50, 52, as illustrated in FIG. 5, while in another embodiment of the invention, as illustrated in FIG. 6, a plurality of electrical resistance heating elements 56 are cast in place in the at least one platen 50, 52. For example, one or more heating elements 56 may be cast in place in the upper platen 50 alone, the lower platen 52 alone, or in both platens. In the embodiment of FIG. 7, three electrical resistance heating elements 56 are cast in place in at least one platen 50, 52, with the layout and arrangement of the elements configured to avoid the location of various fasting locations 62, where the platen is secured to other portions of the platen assembly 55, 57. Casting of the heating elements 56 directly into the material of the platen 50, 52, prevents air gaps between the heating element and the platen, and so, prevents overheating or hot spots along the length of the heating element, which, in the past, has led to premature failure of the heating elements.

The arrangement of the layout of the heating elements 56 can be selected to assure an even heating of the entire mass of the platen, to avoid hot or cold spots, and also to accommodate various connecting bolts and other obstacles. The layouts shown in FIGS. 5, 6 and 7 are merely illustrative of possible layout arrangements, and other layout arrangements are contemplated by the present invention. Since the heating elements 56 are not required to be removed and replaced, they are not required to be formed in a linear fashion.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

We claim:

1. A moving belt conveyor dough press comprising:
a pair of vertically opposing platens, at least one of which is movable toward and away from the other,
the platens each having a horizontal dimension in a first direction of at least 32 inches and a horizontal dimension in a second direction perpendicular to the first direction of at least 32 inches and a weight of at least 350 pounds,
a continuous belt arranged to pass between said pair of platens, and to carry on an upper surface thereof, a supply of dough masses to be pressed by the platens,
both of the platens having at least a portion being formed of a cast metal material, and
at least one electrical resistance heating element cast in place within the cast metal portion of each of the platens, the total power consumed by the at least one electrical resistance heating element in each of the platens comprising at least 2355.2 watts, and wherein the electrical resistance heating element is sized to heat the platen to between 150 and 550° F.

2. A moving belt conveyor dough press according to claim 1, wherein an upper one of the platens is vertically reciprocable and a lower one of the platens is vertically stationary.

3. A moving belt conveyor dough press according to claim 1, including a pair of electrical terminals for the heating element are exposed at an exterior of the at least one platen.

4. A moving belt conveyor dough press according to claim 1, wherein a plurality of electrical resistance heating elements are cast in place in at least one of the platens.

5. A moving belt conveyor dough press according to claim 1, wherein the platens are horizontally fixed in place.

6. A moving belt conveyor dough press according to claim 1, wherein the platens are horizontally movable.

7. A moving belt conveyor dough press comprising:
a pair of vertically opposing platens, at least an upper one of which is movable toward and away from a lower one,
the platens each having a horizontal dimension in a first direction of at least 32 inches and a horizontal dimension in a second direction perpendicular to the first direction of at least 32 inches and a weight of at least 350 pounds,
a continuous belt arranged to pass between said pair of platens, and to carry on an upper surface thereof, a supply of dough masses to be pressed by the platens,
both of the platens having at least a portion being formed of a cast metal material, and
at least one electrical resistance heating element cast in place within both of the platens, the total power consumed by the at least one electrical resistance heating element in each of the platens comprising at least 2355.2 watts, and wherein the electrical resistance heating element is sized to heat the platen to between 150 and 550° F.

8. A moving belt conveyor dough press according to claim 7, wherein a plurality of electrical resistance heating elements are cast in place in the upper platen.

9. A moving belt conveyor dough press according to claim 7, including a pair of electrical terminals for the heating element are exposed at an exterior of the upper platen.

10. A moving belt conveyor dough press according to claim 7, wherein the platens are horizontally fixed in place.

11. A moving belt conveyor dough press according to claim 7, wherein the platens are horizontally movable.

12. A moving belt conveyor dough press comprising:
a pair of vertically opposing platens, at least an upper one of which is movable toward and away from a lower one,
the platens each having a horizontal dimension in a first direction of at least 32 inches and a horizontal dimension in a second direction perpendicular to the first direction of at least 32 inches and a weight of at least 350 pounds,
the platens being horizontally movable,
a continuous belt arranged to pass between said pair of platens, and to carry on an upper surface thereof, a supply of dough masses to be pressed by the platens,
both of the platens having at least a portion being formed of a cast metal material, and
at least one electrical resistance heating element cast in place within both of the platens, and including a pair of electrical terminals for each of the heating elements being exposed at an exterior of each of the platens, the total power consumed by the at least one electrical resistance heating element in each of the platens comprising at least 2355.2 watts, and wherein the electrical resistance heating element is sized to heat the platen to between 150 and 550° F.

13. A moving belt conveyor dough press according to claim 12, wherein a plurality of electrical resistance heating elements are cast in place in the upper platen.

14. A moving belt conveyor dough press according to claim 12, wherein the electrical resistance heating element is sized to consume between 2.3 and 3.0 watts per square inch of platen area.

* * * * *